Oct. 13, 1953     R. E. FIGORE ET AL     2,655,134
HYDRAULIC WINDSHIELD WIPER MOTOR
Filed July 30, 1951
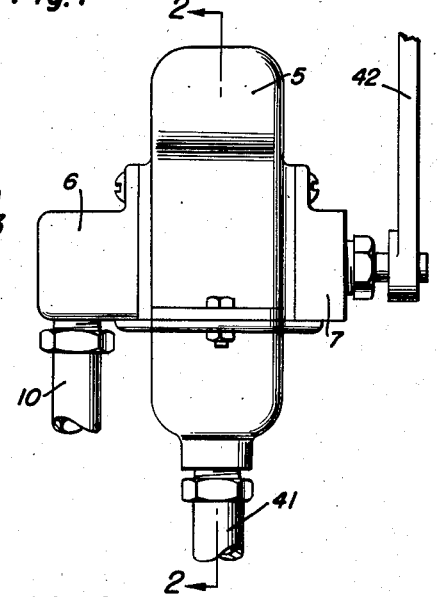
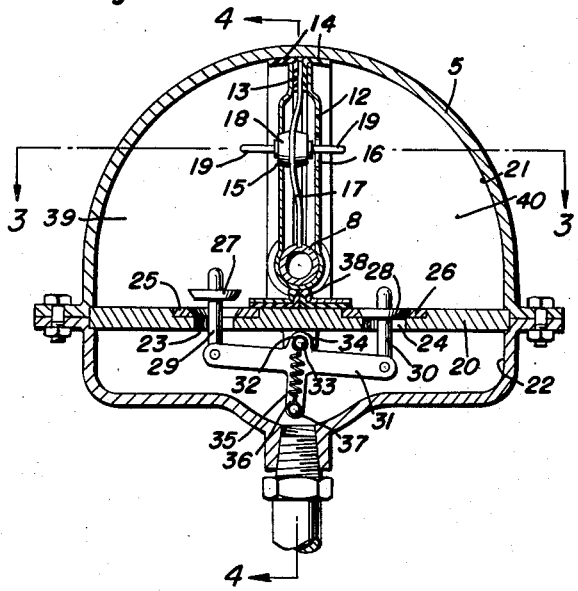
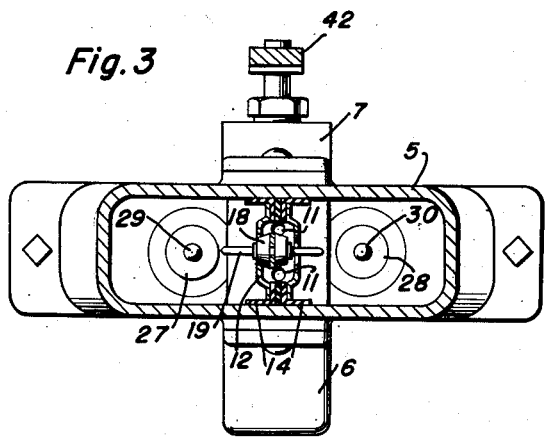
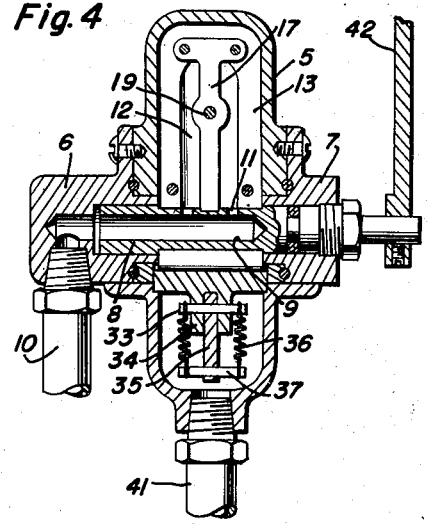
Roland E. Figore
Earl A. Otto
          INVENTORS.
BY
                 Attorneys Patented Oct. 13, 1953

2,655,134

UNITED STATES PATENT OFFICE 2,655,134

HYDRAULIC WINDSHIELD WIPER MOTOR

Roland E. Figore, Tarentum, Pa., and
Earl A. Otto, Reseda, Calif.

Application July 30, 1951, Serial No. 239,362

3 Claims. (Cl. 121—97)

The present invention relates to new and useful improvements in windshield wiper motors and more particularly to a fluid pressure operated motor driven by the oil pressure of the lubricating system of a vehicle engine.

An important object of the invention is to provide a motor of this character of simple and practical construction, which is efficient and reliable in operation, relatively inexpensive to manufacture and otherwise to generally improve the windshield wiper operating mechanism.

Other objects and advantages reside in the details of construction and operation as more fully hereinafter described and claimed, reference being had to the accompanying drawings forming part hereof, wherein like numerals refer to like parts throughout, and in which:

Figure 1 is an end elevational view of the motor;

Figure 2 is a vertical sectional view taken on a line 2—2 of Figure 1;

Figure 3 is a horizontal sectional view taken on a line 3—3 of Figure 2; and

Figure 4 is a transverse sectional view taken on a line 4—4 of Figure 2.

Referring now to the drawing in detail, wherein for the purpose of illustration we have disclosed a preferred embodiment of our invention, the numeral 5 designates a semi-circular casing having bearings 6 and 7 secured to its opposite sides and in which the ends of an oscillating shaft 8 are journaled.

Shaft 8 is hollow at one end 9 for connecting to an inlet pipe 10 which is connected to the usual oil lubricating system of a vehicle engine (not shown), and lateral ports 11 are formed in the upper side of the shaft leading to a hollow vane 12. Vane 12 is constructed of sheet metal bent into substantially U-shape tightly about the shaft and sealed at the edges of the strip by double gasket 13 of rubber or other suitable material and with the edges of the gaskets projecting beyond the side edges and end of the vane to form sealing flanges 14 in wiping contact with the walls of the casing.

The sides of vane 12 are formed with ports 15 and 16 and a resilient metal strip 17 is suitably anchored at one end to shaft 8 inside vane 12 to extend longitudinally thereof and with the outer end of the strip held between the gaskets at the outer end of the vane in a distorted position to form a snap spring. A double valve 18 is supported on strip 17 to close ports 15 and 16 and pins 19 project beyond the valves through the ports at the opposite sides of the vane.

A partition 20 is secured in casing 5 to form upper and lower chambers 21 and 22 therein with ports 23 and 24 in the partition at opposite sides of the vane and provided at the top of the partition with valve seats 25 and 26 in which valves 27 and 28 are seated.

The valves 27 and 28 are provided with valve stems 29 and 30 pivoted at their lower ends to the ends of a T-shaped rocker arm 31 which is pivoted by an eye 32 at its upper central portion to a pin 33 on a bracket 34 at the underside of the partition. A stem 35 extends downwardly from the center of arm 31 and a pair of coil springs 36 are held under tension between pin 33 and a pin 37 at the lower end of stem 35 to snap valves 27 and 28 open and closed as the arm 31 is rocked past its horizontal position.

A sealing strip 38 of suitable material is secured to partition 20 under shaft 8 to seal the lower edge of vane 12 and to provide expansible chambers 39 and 40 in upper chamber 21 and at the opposite sides of the vane.

A return pipe 41 is connected to the bottom of chamber 22 to return the oil to the engine crank case (not shown).

A wiper arm 42 for a windshield wiper blade (not shown) is attached to the solid end of shaft 8 and in the operation of the device oil under pressure enters pipe 10 and hollow end 9 of shaft 8 and passes through ports 11 into the hollow vane 12. Snap spring 17 holds double valve 18 in one side of the vane to close one port 15 and open the other port 16 whereupon the oil will enter chamber 40. With outlet valve 28 for chamber 40 closed the pressure of oil in chamber 40 will swing vane 12 to the left (see Figure 1) and oil in chamber 39 will escape through port 23 since outlet valve 27 therefor will be held open. Shaft 8 will thus be oscillated to swing arm 42 in one direction and as pin 19 in chamber 39 is lowered to contact partition 20 the snap spring 17 will be forced to the opposite side of vane 12 to open port 15 and close port 16 and at the same time the vane 12 will strike valve stem 29 for valve 27 and close the latter and rock arm 31 to open valve 28.

Oil will then enter chamber 39 and escape from chamber 40 to oscillate shaft 8 and wiper arm 42 in an opposite direction.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A hydraulic motor comprising a semi-circular casing, a partition in the casing defining an upper chamber and a lower chamber therein, an oscillatable shaft journalled in the sides of the casing in the upper chamber and having a hollow end adapted for attaching a fluid supply pipe thereto, the other end of the shaft being solid and projecting outwardly of the casing and adapted for performing work, a hollow vane fixed to the shaft and having a working fit in the upper chamber to form a pair of expansible chambers at opposite sides of the vane, said shaft having a lateral port leading to the interior of the vane and said vane having ports at each side leading to the respective expansible chambers, a spring biased double valve in the vane alternately opening and closing the ports therein, valve actuating means projecting from opposite sides of the vane and movable into engagement with the partition upon opposite swinging movement of the vane to oppositely actuate the valve to open one port in the vane and close the other port therein, said lower chamber having a return pipe connected thereto, an outlet valve in the partition for each expansible chamber and actuated by the vane, and a spring biased rocker arm connecting the outlet valves to each other for opposite opening and closing movement.

2. A hydraulic motor comprising a semi-circular casing, a partition in the casing defining an upper chamber and a lower chamber therein, an oscillatable shaft journalled in the sides of the casing in the upper chamber and having a hollow end adapted for attaching a fluid supply pipe thereto, the other end of the shaft being solid and projecting outwardly of the casing and adapted for performing work, a hollow vane fixed to the shaft and having a working fit in the upper chamber to form a pair of expansible chambers at opposite sides of the vane, said shaft having a lateral port leading to the interior of the vane and said vane having ports at each side leading to the respective expansible chambers, a spring biased double valve in the vane alternately opening and closing the ports therein, valve actuating means projecting from opposite sides of the vane and movable into engagement with the partition upon opposite swinging movement of the vane to oppositely actuate the valve to open one port in the vane and close the other port therein, said lower chamber having a return pipe connected thereto, an outlet valve in the partition for each expansible chamber and disposed in the path of the vane for actuation thereby, and a spring biased rocker arm connecting the outlet valves to each other for opposite opening and closing movement.

3. A hydraulic motor comprising a semi-circular casing, a partition in the casing defining an upper chamber and a lower chamber therein and having outlet ports in the partition, an oscillatable shaft journalled in the sides of the casing in the upper chamber and having a hollow end adapted for attaching a fluid supply pipe thereto, the other end of the shaft being solid and projecting outwardly of the casing and adapted for performing work, a hollow vane fixed to the shaft and having a working fit in the upper chamber to form a pair of expansible chambers at opposite sides of the vane, said shaft having a lateral port leading to the interior of the vane and said vane having a port at each side leading to the respective expansible chambers, a double ended valve internally of the vane and alternately closing the ports in the vanes and including means projecting outwardly at opposite sides of the vane actuated upon contact with the partition upon predetermined oscillating movements of the vane, a leaf spring fixed to the shaft and extending radially therefrom internally of the vane and secured to said double ended valve in a position with one port in the vane open and with the other port in the vane closed, said lower chamber having a return pipe connected thereto, a rocker arm pivoted in the lower chamber, spring means holding the rocker arm in oppositely tilted positions, and outlet valves connected to the ends of the rocker arm and having stems projecting upwardly into the upper chamber in the path of the vane for oppositely actuating said outlet valves.

ROLAND E. FIGORE.
EARL A. OTTO.

References Cited in the file of this patent
UNITED STATES PATENTS

| Number | Name | Date |
|---|---|---|
| 861,690 | Yost et al. | July 30, 1907 |
| 958,152 | Mezger | May 17, 1910 |
| 2,499,671 | Nordenstam | Mar. 7, 1950 |